(12) United States Patent
Ferguson et al.

(10) Patent No.: US 8,036,379 B2
(45) Date of Patent: Oct. 11, 2011

(54) CRYPTOGRAPHIC PROCESSING

(75) Inventors: Niels T. Ferguson, Redmond, WA (US); Peter L. Montgomery, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1246 days.

(21) Appl. No.: 11/376,454

(22) Filed: Mar. 15, 2006

(65) Prior Publication Data

US 2007/0237324 A1   Oct. 11, 2007

(51) Int. Cl.
*H04L 9/00* (2006.01)
*H04K 1/00* (2006.01)
*H04L 29/02* (2006.01)

(52) U.S. Cl. ............ 380/29; 713/164; 713/193; 380/37; 380/277; 726/5; 726/9

(58) Field of Classification Search .............. 380/29, 380/28, 37, 277; 713/164–167, 193; 711/100; 726/5, 9, 18
See application file for complete search history.

(56) References Cited

U.S. PATENT DOCUMENTS

| | | | | |
|---|---|---|---|---|
| 5,568,624 A * | 10/1996 | Sites et al. | .................... | 712/223 |
| 5,845,060 A * | 12/1998 | Vrba et al. | ..................... | 714/12 |
| 6,141,420 A * | 10/2000 | Vanstone et al. | ................ | 380/30 |
| 6,351,806 B1 * | 2/2002 | Wyland | ......................... | 712/225 |
| 6,618,483 B1 * | 9/2003 | Vanstone et al. | ................ | 380/30 |
| 6,769,063 B1 * | 7/2004 | Kanda et al. | .................. | 713/193 |
| 7,343,389 B2 * | 3/2008 | Macy et al. | .................... | 708/491 |
| 7,421,463 B2 * | 9/2008 | Umeno | ......................... | 708/250 |
| 7,783,037 B1 * | 8/2010 | Bong | .............................. | 380/37 |
| 2004/0028224 A1 * | 2/2004 | Liardet et al. | .................. | 380/37 |
| 2004/0184609 A1 * | 9/2004 | Umeno | ......................... | 380/46 |
| 2005/0084099 A1 * | 4/2005 | Montgomery | .................. | 380/28 |
| 2007/0118582 A1 * | 5/2007 | Henry et al. | .................. | 708/250 |
| 2008/0285745 A1 * | 11/2008 | Teglia et al. | .................. | 380/29 |

OTHER PUBLICATIONS

Federal Information Processing Standards Publication 197, Announcing the Advanced Encryption Standard (AES), Nov. 26, 2001, 52 pages.

* cited by examiner

*Primary Examiner* — Kim Vu
*Assistant Examiner* — Sayed Beheshti Shirazi
(74) *Attorney, Agent, or Firm* — Woodcock Washburn LLP (57) ABSTRACT

Executable instructions designed to provide faster cryptographic processing, fixed-timing memory access, and dedicated memory usage are implementable on an x86 CPU utilizing XMM registers. The instructions can be utilized to implement cryptographic processing in accordance with the Advanced Encryption Standard (AES). To encrypt, a single instruction performs nonlinear transformation, rotation, and linear transformation. Another single instruction used during encryption performs nonlinear transformation and rotation. New instructions also are implemented to perform decryption. The instructions implemented to perform decryption perform the mathematical inverse functions of their counterparts used for encryption.

18 Claims, 7 Drawing Sheets

CRYPTOGRAPHIC PROCESSING

TECHNICAL FIELD

The technical field generally relates to computer processing and more specifically relates to computer-implemented cryptographic processing.

BACKGROUND

With an ever-increasing emphasis on security, the use of cryptographic techniques in computer processing systems is becoming more prevalent. As a result, larger portions of processing resources are being devoted to cryptographic processing. Cryptographic processing can be computationally intensive and time consuming.

Currently, many systems utilize cryptographic techniques in accordance with the Advanced Encryption Standard (AES), Federal Information Processing Standards Publication 197, Nov. 26, 2001, available at http://csrc.nist.gov/publications/fips/fips197/fips-197.pdf. The AES, also known as the Rijndael algorithm, specifies cryptographic techniques that can be used to protect electronic data. The AES is a symmetric block cipher that can encrypt (encipher) and decrypt (decipher) information. Some aspects of the AES are computationally intensive and can present processing "bottlenecks." These bottlenecks can slow down security applications and can interfere with other processes being executed on a processor. Further, close analysis of the timing associated with cryptographic processing in accordance with some current implementations of the AES can lead to leakage of cryptographic keys, which could result in weakened security.

SUMMARY

This Summary is provided to introduce a selection of concepts in a simplified form that are further described below in the Detailed Description Of The Illustrative Embodiments. This Summary is not intended to identify key features or essential features of the claimed subject matter, nor is it intended to be used to limit the scope of the claimed subject matter.

Various techniques for improved cryptographic processing include new computer-executable instructions designed to provide faster cryptographic processing, fixed-timing memory access, and dedicated memory usage. In an exemplary embodiment, the new instructions are implementable in a central processing unit (CPU) of a processor utilizing 128-bit XMM registers of the CPU. The new instructions combine the functionality of several instructions in a much more efficient and less time consuming manner. The combined functionality along with use of the XMM registers provides faster cryptographic processing. In accordance with fixed-timing memory access, each read and write of cryptographic parameters takes the same amount of time. Thus, an observer can not gain knowledge of the value of the parameter, such as a cryptographic key, by the amount of time it takes to read and/or write data whose location may be dependent on the cryptographic parameter. These reads and writes must not leak other observable information, such as the state of cache lines. Dedicated memory usage helps to provide faster cryptographic processing because a dedicated processing thread can not be interrupted by other processes.

BRIEF DESCRIPTION OF THE DRAWINGS

The foregoing summary, as well as the following detailed description, is better understood when read in conjunction with the appended drawings. For the purpose of illustrating improved cryptographic processing, there is shown in the drawings exemplary constructions thereof; however, improved cryptographic processing is not limited to the specific methods and instrumentalities disclosed. In the drawings.

DETAILED DESCRIPTION OF ILLUSTRATIVE EMBODIMENTS

Improved cryptographic processing is described herein. In an exemplary embodiment, computer-executable instructions for improving cryptographic processing are described. These instructions can be implemented on any appropriate processor. In an exemplary embodiment, the instructions are capable of being implemented on the known x86 family of microprocessors utilizing XMM registers contained therein. The instructions can be utilized with any appropriate cryptographic technique, such as symmetric or asymmetric techniques, for example. In an exemplary embodiment, the instructions are utilized in accordance with the Advanced Encryption Standard (AES). The AES describes a symmetric encryption technique. A detailed description of the AES can be found in the Federal Information Processing Standards Publication 197 (FIPS PUB 197), dated Nov. 26, 2001. For the sake of clarity, computer-executable instructions for improving cryptographic processing are described herein with application to a central processing unit (CPU) having an x86 architecture implementing cryptographic processing in accordance with the AES. It is to be understood that this embodiment is exemplary, and other embodiments are applicable. For example, other processor types and/or other cryptographic techniques can be utilized.

Figure 1:
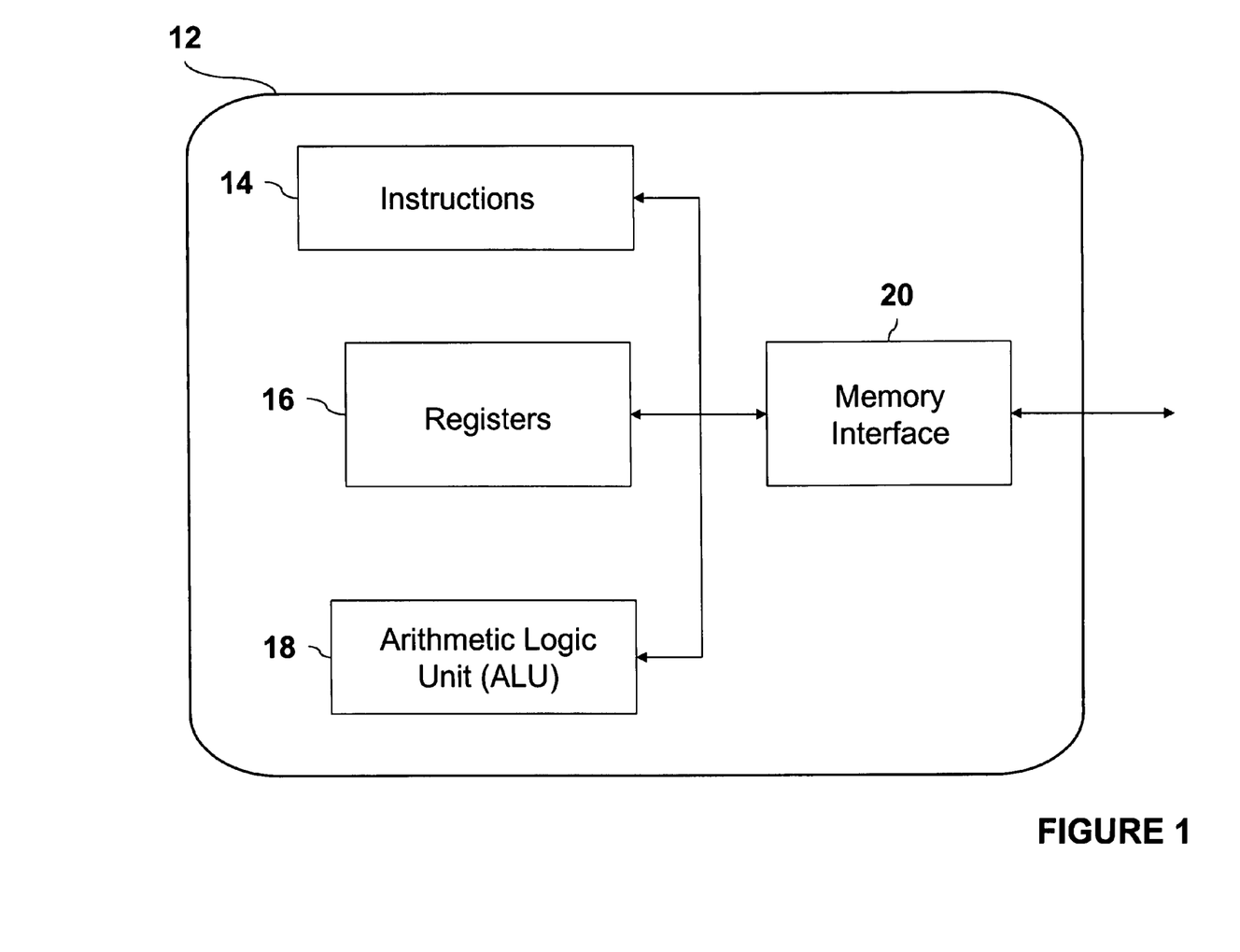
FIG. 1 is a diagram of an exemplary CPU for implementing improved cryptographic processing.

FIG. 1 is a diagram of an exemplary central processing unit (CPU) 12 for implementing improved cryptographic processing. CPU 12 comprises an instruction portion 14, registers 16, an arithmetic unit (ALU) 18, and a memory interface 20. CPU executes instructions provided by instruction portion 14. Instruction portion 14 fetches and/or decodes instructions from a sequence of instructions (e.g., program). The sequence of instructions can be stored in memory such as cache memory or disk memory, for example (cache memory and disk memory not shown in FIG. 1.) In an exemplary embodiment, the program is a program for encrypting and/or decrypting information.

The ALU 18 performs arithmetic and logical operations (e.g., addition, multiplication, exclusive oring, bit rotation/shift). In an exemplary embodiment, the values stored in registers 16 are provided to the ALU 18 for processing. The results of operations performed by ALU 18 are provided to registers 16, to memory interface 20 for storage in memory (e.g., cache memory), or a combination thereof. Results stored in the registers 16 can be utilized as input to the next ALU operation.

Cryptographic processing can be computationally expensive and time consuming. Registers 16 are utilized to aid in performing operations quickly. Registers 16 provide the fastest access to information. In an exemplary embodiment, cryptographic processing is performed using XMM registers of an x86 family of processors. XMM is indicative of a single instruction multiple data (SIMD) instruction set utilized with the x86 architecture.

Figure 2:
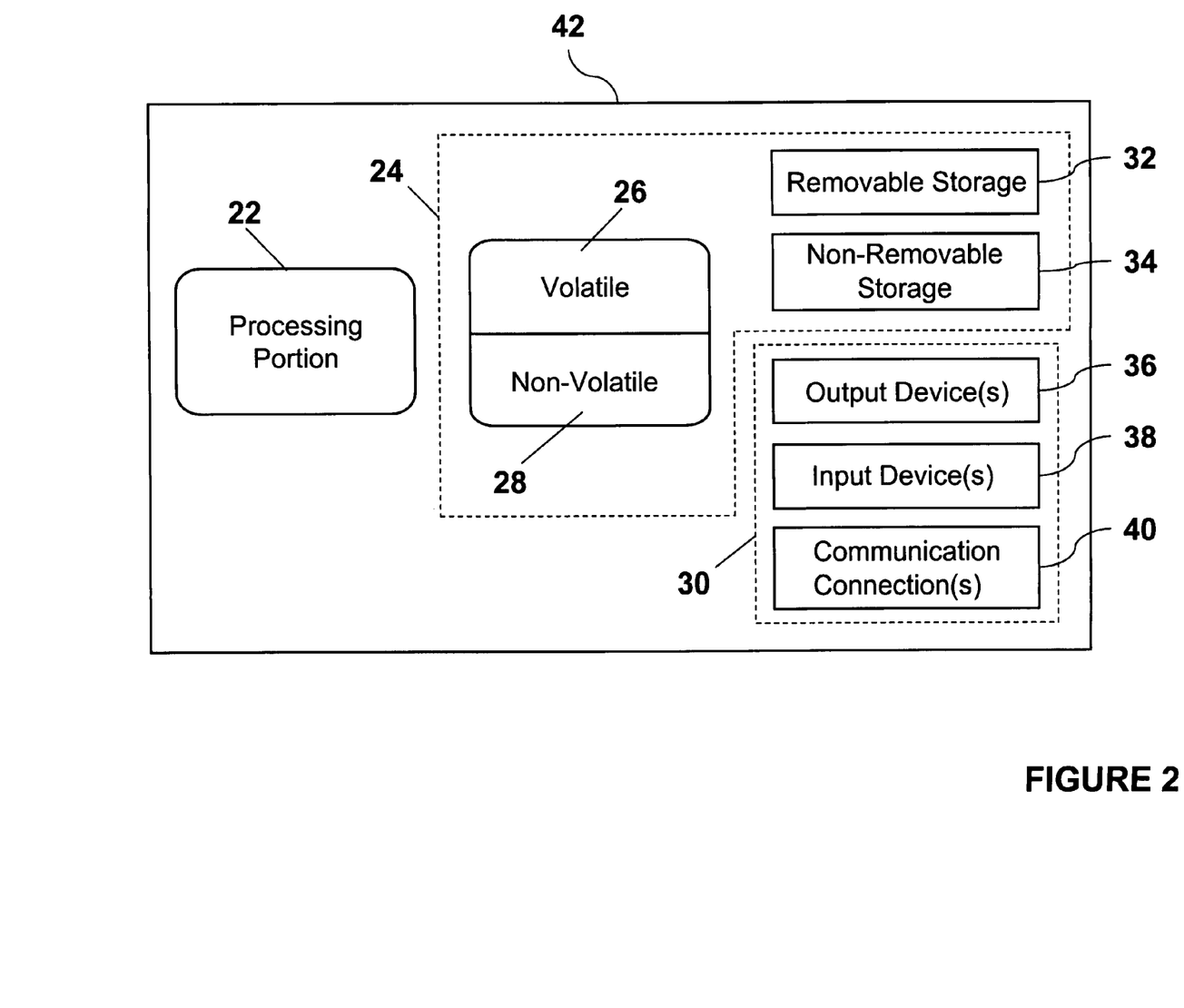
FIG. 2 is a diagram of an exemplary processor for implementing improved cryptographic processing.

FIG. 2 is a diagram of an exemplary processor 42 for implementing improved cryptographic processing. Processor 42 comprises a processing portion 22, a memory portion 24, and an input/output portion 30. In an exemplary embodiment, processor portion 22 comprises CPU 12 and registers 16 including XMM registers. The processing portion 22, memory portion 24, and input/output portion 30 are coupled together (coupling not shown in FIG. 2) to allow communications therebetween. The processing portion 22 is capable of performing cryptographic processing, such as encryption and decryption, for example. The memory portion 24 is capable of storing all parameters (as described in more detail below) associated with cryptographic processing, such as cryptographic keys and substitution values, for example. Input/output portion 30 is capable of providing and/or receiving components utilized to implement improved cryptographic processing.

Processor 42 can be implemented as a client processor and/or a server processor. In a basic configuration, the processor 42 can include at least one processing portion 22 and memory portion 24. Depending upon the exact configuration and type of processor, the memory portion 24 can be volatile (such as RAM and/or cache) 26, non-volatile (such as ROM, flash memory, etc.) 28, or a combination thereof. The processor 42 can have additional features/functionality. For example, the processor 42 can include additional storage (removable storage 32 and/or non-removable storage 34) including, but not limited to, magnetic or optical disks, tape, flash, smart cards or a combination thereof. Computer storage media, such as memory portion 24, 26, 28, 32, and 34, include volatile and nonvolatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium which can be used to store the desired information and which can be accessed by the processor 42. Any such computer storage media can be part of the processor 42.

Processor 42 also can contain communications connection(s) 40 that allow the processor 42 to communicate with other devices. Communications connection(s) 40 is an example of communication media. Communication media typically embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. The term computer readable media as used herein includes both storage media and communication media. The processor 42 also can have input device(s) 38 such as keyboard, mouse, pen, voice input device, touch input device, etc. Output device(s) 36 such as a display, speakers, printer, etc. also can be included.

Figure 3:
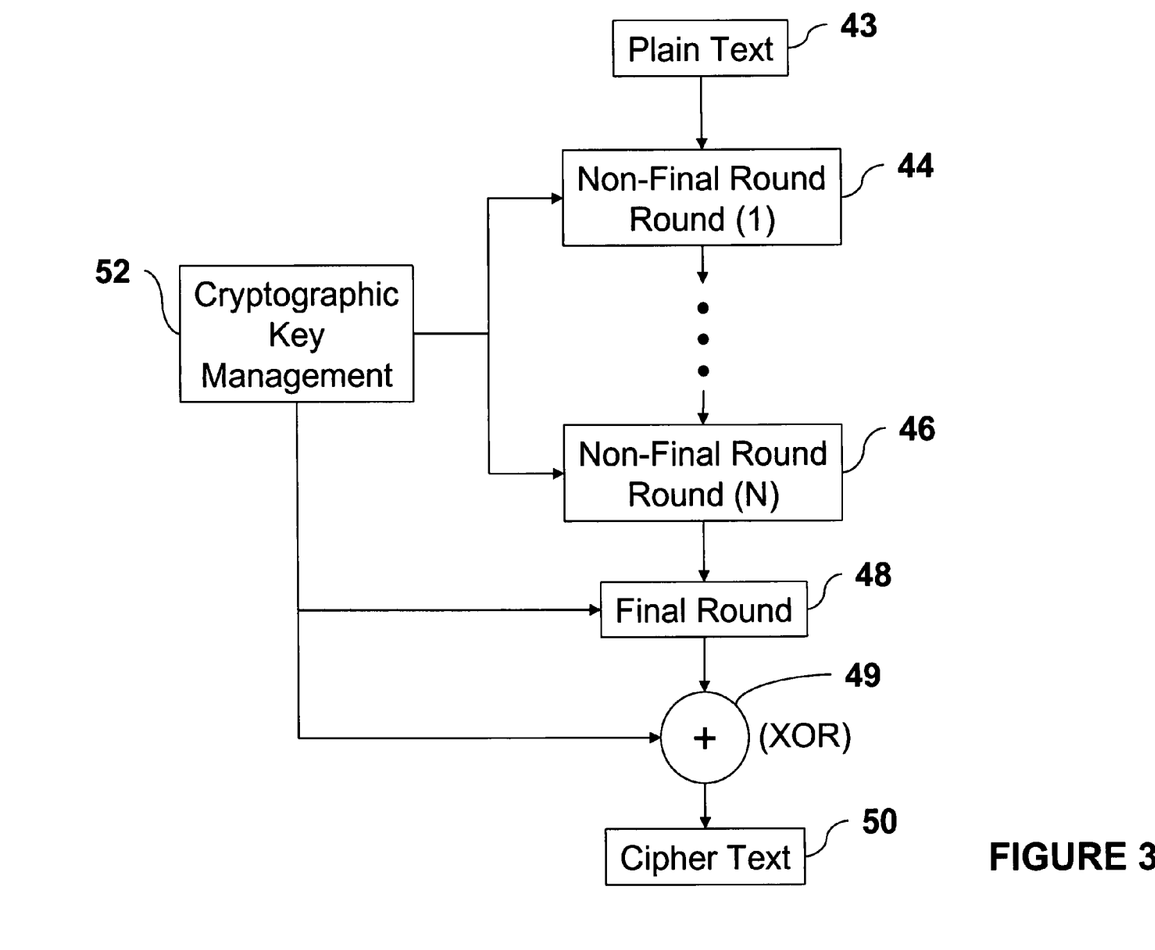
FIG. 3 is a depiction of an exemplary embodiment of an improved encryption process.

FIG. 3 is a depiction of an exemplary embodiment of an improved encryption process. Plain text (information to be encrypted) is provided at step 43. Plain text can comprise any appropriate information to be encrypted, such as text, data, video information, image information, audio information, computer executable instructions, information that was previously encrypted, or a combination thereof, for example. In an exemplary embodiment, plain text is represented as an array of bytes. The input data is loaded into an 128-bit XMM register, representing a 4×4 matrix in which each matrix element (cell) is an 8-bit finite field element. The AES algorithm acts on these matrices for several iterations, also referred to as rounds, of processing. The encryption process depicted in FIG. 3 comprises N non-final rounds (depicted as rounds 44 through 46), and a final round 48. Any appropriate number, N, of non-final rounds can be utilized. For example, in the AES algorithm, the value of N can be 9, 11, or 13. Each round, including non-final rounds and the final round is provided a round specific, or iteration specific, cryptographic key provided by key management 52. In an exemplary embodiment, key management 52 functions and schedules keys in accordance with the AES. The output of final round 48 is exclusive ored (XOR'd) at step 49 and the resulting encrypted information, also referred to as cipher text, is provided at step 50. Decryption is the mathematical inverse of encryption, and thus is not explicitly depicted herein.

Figure 4:
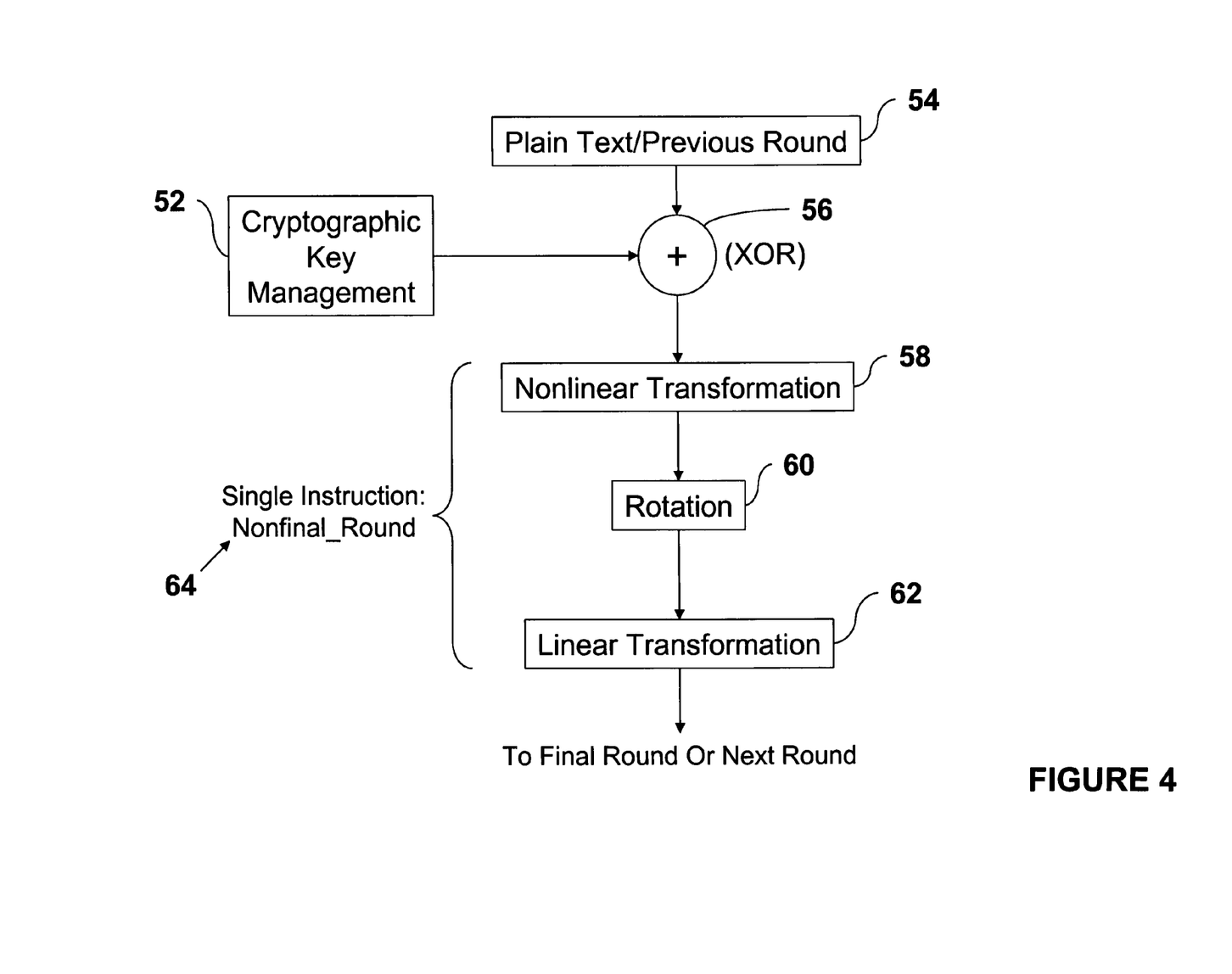
FIG. 4 is a depiction of an exemplary non-final iteration.

Each round, or iteration, comprises addition of a cryptographic key and execution of non-key dependent functions. FIG. 4 is a depiction of an exemplary non-final iteration. Either plain text or information from a previous iteration, represented in matrix form, is loaded into XMM registers and provided at step 54. If the instant round is the first round, plain text is provided at step 54. If the instant round is other than the first round, information from the previous round is provided at step 54. An iteration-specific cryptographic key is loaded into XMM registers as provided by key management 52 and is added (56) to the information provided at step 54. To perform the addition operation 56, an exclusive or (XOR) function is computed between the provided iteration-specific cryptographic key and the information provided at step 54.

The results of the XOR function 56 are loaded into XMM registers and nonlinearly transformed at step 58. In an exemplary embodiment, the nonlinear transformation 58 is performed in accordance with the SubBytes ( ) function as described in the AES. The SubBytes ( ) function nonlinearly substitutes the XOR'd information in the XMM registers using a substitution look up table (referred to an S-box). The results of the nonlinear transformation 58 are loaded into XMM registers and rotated at step 60. In an exemplary embodiment, rotation 60 is performed in accordance with the ShiftRows ( ) function as described in the AES.

Referring again to FIG. 4, the results of rotation 60 are loaded into XMM registers and linearly transformed at step 62. In an exemplary embodiment, linear transformation 62 is performed in accordance with the MixColumns ( ) Transformation function as described in the AES. Linear transformation 62 comprises multiplying each column of the matrix representation of the results of rotation 60 by a fixed 4×4 matrix over the finite field.

In an exemplary embodiment, nonlinear transformation 58, rotation 60, and linear transformation 62 are merged into a single executable instruction 64 (Nonfinal_Round). Executable instruction 64 can provide more efficient and faster cryptographic processing than provided by individual executable instructions for each of nonlinear transformation 58, rotation 60, and linear transformation 62 because the evaluation of the combined transformation can be optimized as a whole, without the overhead of storing intermediate results in XMM registers.

Figure 5:
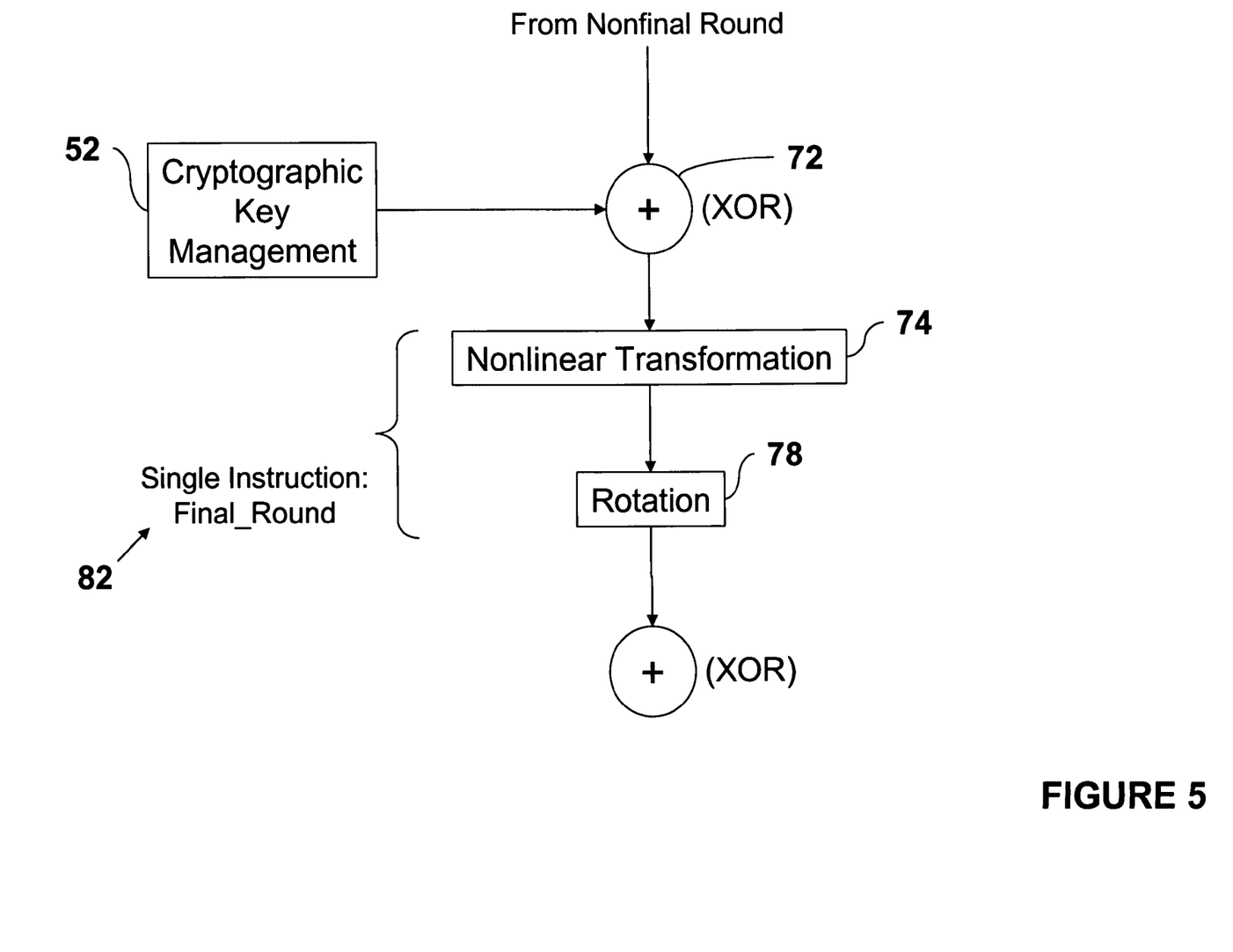
FIG. 5 is a depiction of an exemplary final iteration.

FIG. 5 is a depiction of an exemplary final iteration (e.g., final round 48 of FIG. 3). Linearly transformed information (step 62) is added 72 (XOR'd) with an iteration-specific cryptographic key as provided by key management 52. Note that in an embodiment having N final rounds, step 62 is performed N times. An iteration-specific cryptographic key is loaded into XMM registers as provided by key management 52 and is added (72) to the linearly transformed information provided at step 62. To perform the addition operation 72, an exclusive or (XOR) function is computed. The results of the XOR function 72 are loaded into XMM registers and nonlinearly transformed at step 74. In an exemplary embodiment, the nonlinear transformation 74 is performed in accordance with the SubBytes ( ) function as described in the AES. The SubBytes ( ) function nonlinearly substitutes the XOR'd information in the XMM registers using a substitution lookup table (referred to an S-box). The results of the nonlinear transformation 74 are loaded into XMM registers and rotated at step 78. In an exemplary embodiment, rotation 78 is performed in accordance with the ShiftRows ( ) function as described in the AES. The results of rotation 78 are provided to an exclusive or function (e.g., XOR 49).

In an exemplary embodiment, nonlinear transformation 74 and rotation 78 are implemented as a single executable instruction 82 (Final_Round). As described above, executable instruction 82 provides more efficient and faster cryptographic processing than provided by individual executable instructions for each of nonlinear transformation 74 and rotation 78.

Figure 6:
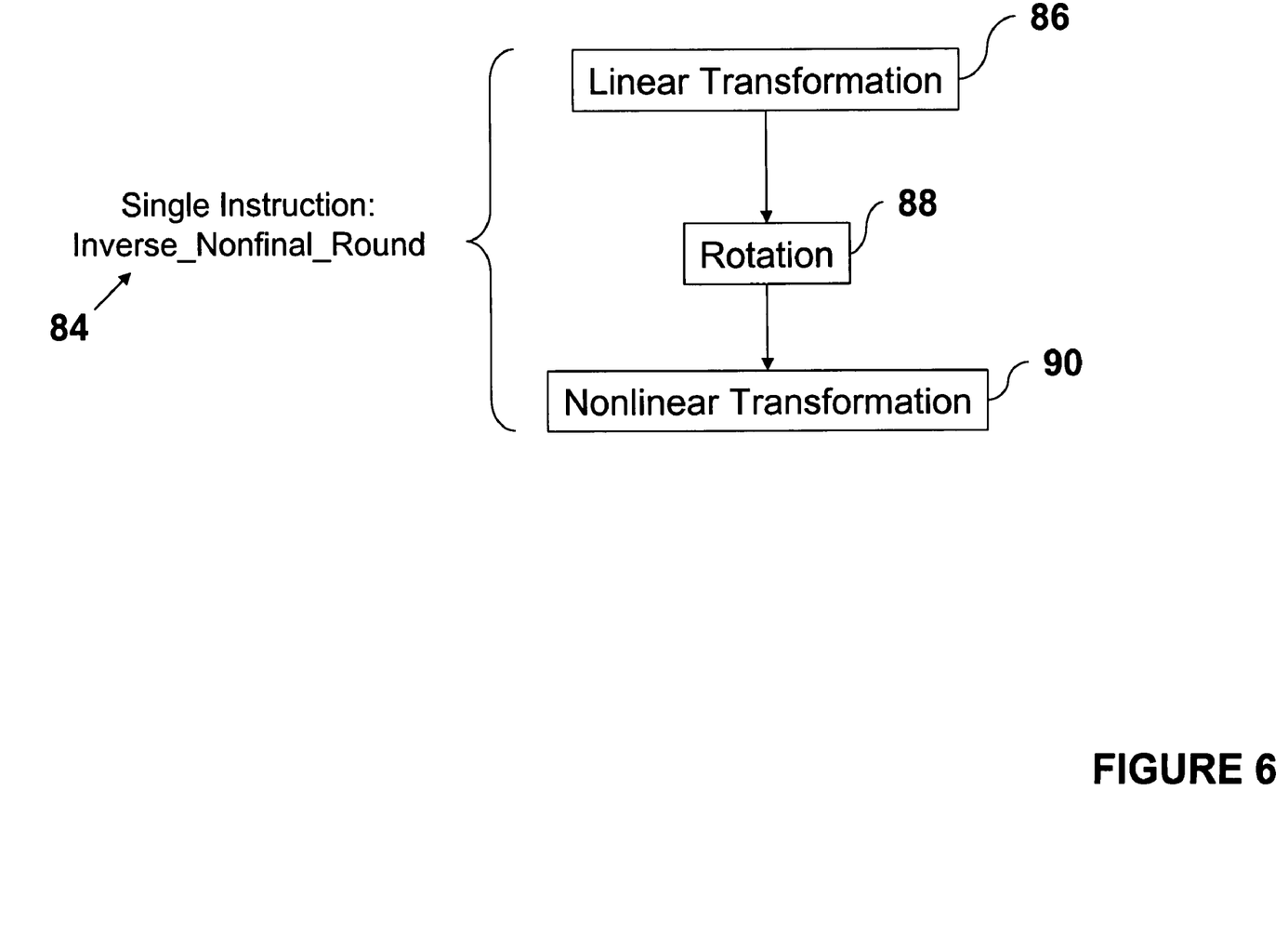
FIG. 6 is a depiction of new executable instruction.

In an exemplary embodiment two executable instructions, Inverse_Nonfinal_Round and Inverse_Final_Round, are utilized to implement decryption. FIG. 6 is a depiction of executable instruction 84, Inverse_Nonfinal_Round. Inverse_Nonfinal_Round 84 is the mathematical inverse of executable instruction 64, Nonfinal_Round. Executable instruction 84, Inverse_Nonfinal_Round, performs linear transformation 86, rotation 88, and nonlinear transformation 90 in the reverse order as performed by executable instruction 64, Nonfinal_Round. Each of linear transformation 86, rotation 88, and nonlinear transformation 90 is the mathematical inverse of its respective counterpart as depicted in FIG. 4. That is, linear transformation 86 is the mathematical inverse of linear transformation 62, rotation 88 is the mathematical inverse of rotation 60, and nonlinear transformation 90 is the mathematical inverse of nonlinear transformation 62.

Figure 7:
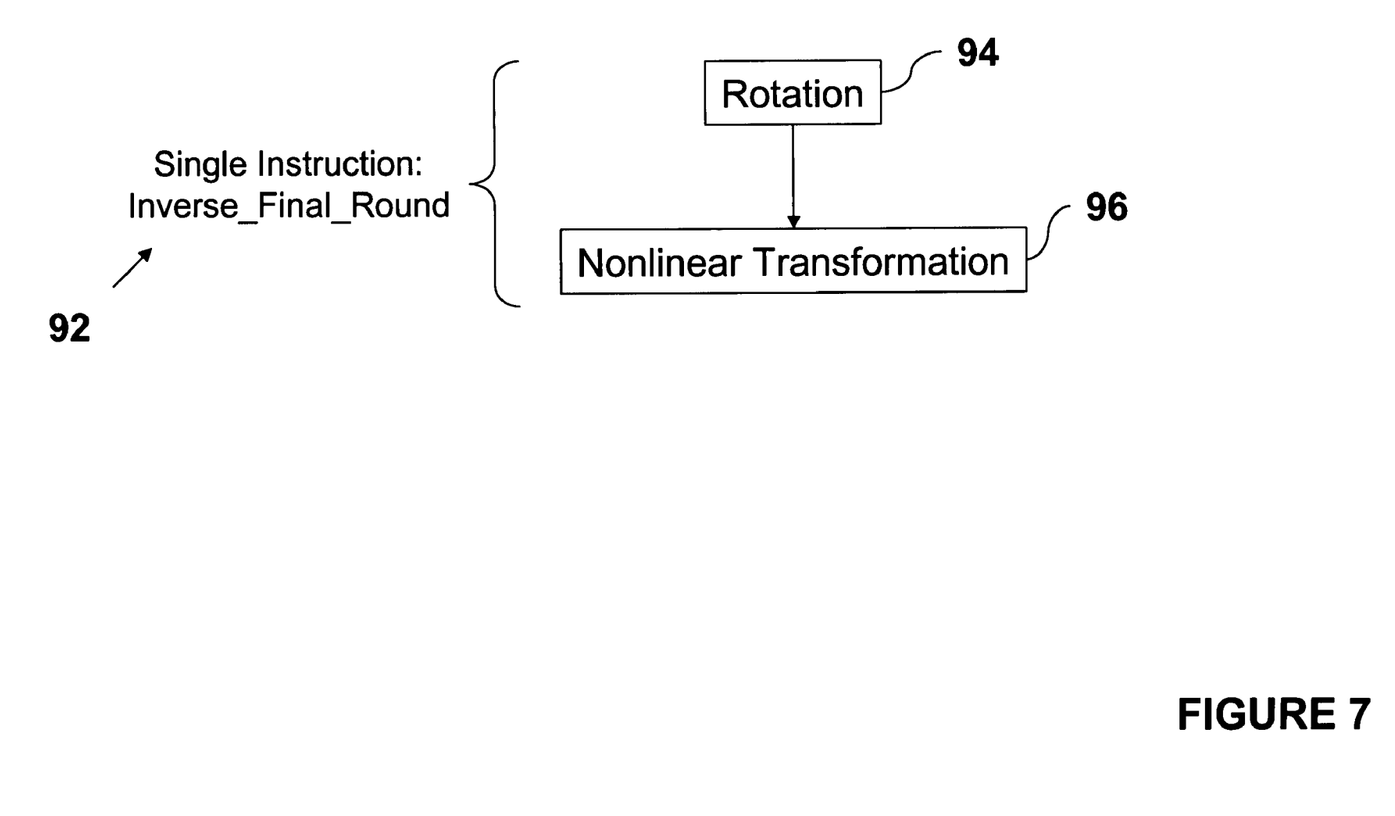
FIG. 7 is a depiction of another new executable instruction.

FIG. 7 is a depiction of executable instruction 92, Inverse_Final_Round. Inverse_Final_Round 92 is the mathematical inverse of executable instruction 82, Final_Round. Executable instruction 92, Inverse_Final_Round, rotation 94 and nonlinear transformation 96 in the reverse order as performed by executable instruction 82, Final_Round. Each of rotation 94 and nonlinear transformation 96 is the mathematical inverse of its respective counterpart as depicted in FIG. 5. That is, rotation 94 is the mathematical inverse of rotation 78 and nonlinear transformation 96 is the mathematical inverse of nonlinear transformation 74.

Many current cryptographic processing implementations that use look up tables, including most AES implementations, are vulnerable to timing attacks. Look-up tables are accessed to provide parameters, such as the S-box parameters in the SubBytes( ) function described above. There are two timing-related problems with using look-up tables. The first one is that the time it takes the cryptographic processing to access the memory depends on whether the requested data is present in the cache. The timing variations that the cryptographic process exhibits can release information about the cryptographic key or other confidential data, especially when other processes on the same CPU are using the cache memory for their own purposes and are causing data from the cryptographic process to be evicted from the cache. The second problem is that if the cryptographic process accesses memory and causes some data to be read into the cache memory, it automatically causes other data to be evicted from the cache memory. This other data might belong to another process on the same CPU, and this other process can detect the fact that its data was evicted from the cache by measuring how long it takes to access said data. This reveals information to the other process about what memory locations were accessed by the cryptographic processing, which in turn can reveal information about the cryptographic key or other confidential information. If the nonlinear transform is implemented as a special instruction, either alone or in combination with other operations, the AES no longer needs key-dependent memory lookups and becomes immune to these attacks.

In an exemplary embodiment, cache memory is accessed such that access times are constant. This "fixed-timing" memory access can be implemented as an executable instruction. The fixed-timing memory access instruction can assign an identical number of clock cycles to each memory access (and can be implemented as a combinatorial circuit because the memory contents are constant and known when the chip is built). Thus, each access to cache memory to perform cryptographic processing as described above, would use the same number of clock cycles. Fixed-timing memory access helps maintain security, in part, because cache access times can not be differentiated in an attempt to derive parameters (e.g., cryptographic keys) and storage addresses of parameters. Further, access times associated with the cache memory for other processes on the same CPU are unaffected by the memory accesses of the non-linear transformation operations of the cryptographic process.

In an exemplary embodiment, cache memory is dedicated to performing cryptographic processes and/or threads. Cryptographic processing is implemented such that each thread or process is assigned its own dedicated cache memory. For example, in one exemplary embodiment, cache memory is split in half and each virtual CPU uses its own half of cache memory. In another exemplary embodiment, a CPU uses the entire cache memory for a currently active thread. During a thread/process switch contents of the cache memory are saved in main memory and the cache memory is reloaded when the tread/process is reactivated. Cache memory dedicated to a thread and/or a process resource allows each thread/process to control its own cache memory contents. For example, a cryptographic processing implementation can ensure that an entire lookup table is in cache memory before it starts the cryptographic processing. Access to cache memory depends on the activity of the thread or process and not on any other activity on the CPU and/or processor.

The various techniques described herein can be implemented in connection with hardware or software or, where appropriate, with a combination of both. Thus, the methods and apparatuses for implementing improved cryptographic processing or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for improved cryptographic processing. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language can be a compiled or interpreted language, and combined with hardware implementations.

In the case of program code, the program(s) can be implemented in assembly or machine language, if desired. In any case, the language can be a compiled or interpreted language, and combined with hardware implementations. The methods and apparatuses for implementing improved cryptographic processing also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for implementing non-fact based authentication. When implemented on a general-purpose processor, the program code combines with the processor to provide a unique apparatus that operates to invoke the functionality of improved cryptographic processing. Additionally, any storage techniques used in connection improved cryptographic processing can invariably be a combination of hardware and software.

While implementation of improved cryptographic processing has been described in connection with the exemplary embodiments of the various figures, it is to be understood that other similar embodiments can be used or modifications and additions can be made to the described embodiments for performing the same functions of implementing improved cryptographic processing without deviating therefrom. Therefore, implementing improved cryptographic processing as described herein should not be limited to any single embodiment, but rather should be construed in breadth and scope in accordance with the appended claims.

What is claimed:

1. A method, implemented at least in part by a computer device, for performing cryptographic processing, said method comprising:
    performing one of a plurality of cipher operations and a plurality of inverse cipher operations, wherein at least one non-linear transformation operation of said one of a plurality of cipher operations and said plurality of inverse cipher operations is performed utilizing an XMM (Extended Multimedia) register of a central processing unit, and wherein each of said cipher operations and inverse cipher operations comprises a plurality of iterations; and
    for each iteration of said plurality of iterations with the exception of a final iteration:
        (a) inserting values indicative of at least a portion of information to be operated on by one of said cipher and inverse cipher operations into said XMM register;
        (b) performing an exclusive or function (XOR) between said values in said XMM register and an iteration-specific cryptographic key, wherein said iteration specific cryptographic key is accessed using a fixed-timing memory access instruction;
        (c) non-linearly transforming values in said XMM register;
        (d) rotating said non-linearly transformed values in said XMM register; and
        (e) linearly transforming said rotated values in said XMM register, wherein the central processing unit comprises cache memory, and each access time associated with accessing said cache memory is assigned an identical number of clock cycles of said central processing unit.

2. A method in accordance with claim 1, wherein the final iteration comprises:
    (f) non-linearly transforming said linearly transformed values in said XMM register; and
    (g) subsequently rotating values in said XMM register.

3. A method in accordance with claim 2, wherein said act of non-linearly transforming values in said XMM register comprises inserting substitute values in said XMM register in accordance with a look up table.

4. A method in accordance with claim 1, wherein a single instruction of an instruction set for said central procession unit executes acts (c), (d), and (e).

5. A method in accordance with claim 2, wherein a single instruction of an instruction set for said central procession unit executes acts (f) and (g).

6. A method in accordance with claim 1, wherein said cache memory comprises dedicated memory.

7. A method in accordance with claim 1, wherein said central processing unit comprises a microprocessor.

8. A method in accordance with claim 1, wherein said cipher operations and said inverse cipher operations are performed in accordance with an advanced encryption standard.

9. A system for performing cryptographic processing, said system comprising:
    a central processing unit for
        performing one of a plurality of cipher operations and a plurality of inverse cipher operations, wherein:
    at least one non-linear transformation operation of said one of a plurality of cipher operations and said plurality of inverse cipher operations is performed utilizing an XMM register of a central processing unit, and wherein each of said cipher operations and said inverse cipher operations comprises a plurality of iterations; and
    for each iteration of said plurality of iterations with exception of a final iteration, said central processing unit:
        (a) inserts values indicative of at least a portion of information to be operated on by one of said cipher and inverse cipher operations into said XMM register;
        (b) performs an exclusive or function (XOR) between said values in said XMM register and an iteration-specific cryptographic key, wherein said iteration specific cryptographic key is accessed using a fixed-timing memory access instruction;
        (c) non-linearly transforms values in said XMM register;
        (d) rotates said non-linearly transformed values in said XMM register;
        (e) linearly transforms said rotated values in said XMM register; and
    said system comprising a memory portion for:
        storing inputs values to be operated on by said cipher operations and said inverse cipher operations; and
    for storing at least one parameter utilized by said cipher operations and said inverse cipher operations, wherein the memory portion comprises cache memory, and each access time associated with accessing said cache memory is assigned an identical number of clock cycles of said central processing unit.

10. A system in accordance with claim 9, wherein said central processing unit comprises a microprocessor.

11. A system in accordance with claim 9, wherein said cipher operations and said inverse cipher operations are performed in accordance with an advanced encryption standard.

12. A system in accordance with claim 9, wherein:
for said final iteration, said central processing unit:
(f) non-linearly transforms said linearly transformed values in said XMM register; and
(g) subsequently rotates values in said XMM register.

13. A system in accordance with claim 12, wherein said central processing unit non-linearly transforms values in said XMM register in part by inserting substitute values in said XMM register in accordance with a look up table.

14. A system in accordance with claim 9, wherein a single instruction of an instruction set for said central procession unit executes acts (c), (d), and (e).

15. A system in accordance with claim 12, wherein a single instruction of an instruction set for said central procession unit executes acts (f) and (g).

16. A system in accordance with claim 12, wherein:
said memory portion comprises cache memory;
said central processing unit accesses said cache memory to perform acts (a) through (g); and
each access time associated with accessing said cache memory to perform acts (a) through (g) is assigned an identical number of clock cycles of said central processing unit.

17. A system in accordance with claim 9, wherein said cache memory is dedicated processing thread.

18. A computer readable storage medium excluding signals having stored thereon instructions for performing cryptographic processing, said cryptographic processing comprising performing one of a plurality of cipher operations and a plurality of inverse cipher operations, wherein:
at least one non-linear transformation operation of said one of a plurality of cipher operations and said plurality of inverse cipher operations is performed utilizing an XMM register of a central processing unit, and wherein each of said cipher operations and inverse cipher operations comprises a plurality of iterations;
for each iteration of said plurality of iterations with the exception of a final iteration:
(a) inserting values indicative of at least a portion of information to be operated on by one of said cipher and inverse cipher operations into said XMM register;
(b) performing an exclusive or function (XOR) between said values in said XMM register and an iteration-specific cryptographic key, wherein said iteration specific cryptographic key is accessed using a fixed-timing memory access instruction;
(c) non-linearly transforming values in said XMM register;
(d) rotating said non-linearly transformed values in said XMM register; and
(e) linearly transforming said rotated values in said XMM register;
each access time associated with accessing said cache memory for performing said cryptographic processing is assigned an identical number of clock cycles of said central processing unit;
and access times associated with said cache memory for performing other than said cryptographic processing are unaffected by said at least one non-linear transformation operation.

* * * * *